United States Patent
Hillier

(10) Patent No.: US 9,753,823 B2
(45) Date of Patent: Sep. 5, 2017

(54) SYSTEM AND METHOD FOR PROVIDING DIAGNOSTIC INFORMATION

(71) Applicant: FREESCALE SEMICONDUCTOR, INC., Austin, TX (US)

(72) Inventor: Curtis L. Hillier, Round Rock, TX (US)

(73) Assignee: NXP USA, INC., Austin, TX (US)

( * ) Notice: Subject to any disclaimer, the term of this patent is extended or adjusted under 35 U.S.C. 154(b) by 190 days.

(21) Appl. No.: 14/682,761

(22) Filed: Apr. 9, 2015

(65) Prior Publication Data

US 2016/0299824 A1    Oct. 13, 2016

(51) Int. Cl.
| G06F 11/00 | (2006.01) |
|---|---|
| G06F 11/22 | (2006.01) |
| G06F 13/42 | (2006.01) |
| G06F 11/07 | (2006.01) |
| G06F 11/30 | (2006.01) |

(52) U.S. Cl.
CPC ...... *G06F 11/2247* (2013.01); *G06F 11/0736* (2013.01); *G06F 11/3013* (2013.01); *G06F 13/4208* (2013.01)

(58) Field of Classification Search
CPC ............. G06F 11/2247; G06F 11/0736; G06F 11/0742; G06F 11/3013; G06F 11/3466; G06F 11/36; G06F 11/3612; G06F 11/3636; G06F 11/364; G06F 11/3656; G06F 13/4208; G06F 11/0739
USPC ................. 714/48, 25, 27, 30, 37, 39, 40, 45
See application file for complete search history.

(56) References Cited

U.S. PATENT DOCUMENTS

| 5,745,777 A * | 4/1998 | English ................. H04H 20/12 375/228 |
|---|---|---|
| 6,918,065 B1 | 7/2005 | Edwards et al. |
| 7,861,070 B2 | 12/2010 | Huang et al. |
| 2004/0218568 A1* | 11/2004 | Goodall ............... H04L 1/0002 370/332 |
| 2010/0211828 A1* | 8/2010 | Moyer ............... G06F 11/3636 714/45 |
| 2012/0089893 A1 | 4/2012 | Bousamra |

(Continued)

OTHER PUBLICATIONS

Thripurna et al., "An advanced tracing mechanism for optimum debugging support for soc's", International Journal of Advanced Research in Computer and Communication Engineering, vol. 2, Issue 10, pp. 3993-3998, Oct. 2013.*

*Primary Examiner* — Joseph D Manoskey

(57) ABSTRACT

A data processing system has a system bus, an analog-to-digital converter (ADC), a signal processor, a memory, compression and packing units, and a debug unit. The ADC samples a baseband signal, and provides a digitized signal representative of the baseband signal the system bus. The signal processing block converts the digitized signal to a processed signal in the frequency domain. The memory is coupled to the system bus and is for storing the processed signal. The compression unit is coupled to the system bus and is for capturing the processed signal and compressing the processed signal to produce a compressed signal. The packing unit is coupled to the compression unit and is for packing the compressed signal to produce a packed signal. The debug unit is coupled to the packing unit and is for converting the compressed and packed signal to a diagnostic message. The disclosed data processing system and method provides diagnostic messages in near real-time.

20 Claims, 3 Drawing Sheets

(56) References Cited

U.S. PATENT DOCUMENTS

| | | | |
|---|---|---|---|
| 2012/0165638 A1 | 6/2012 | Duke et al. | |
| 2013/0314271 A1* | 11/2013 | Braswell | G01S 13/34 342/70 |
| 2014/0013421 A1* | 1/2014 | Hopkins | G06F 21/62 726/17 |
| 2014/0068346 A1* | 3/2014 | Scott | G06F 11/3636 714/45 |

* cited by examiner

SYSTEM AND METHOD FOR PROVIDING DIAGNOSTIC INFORMATION

BACKGROUND

Field

This disclosure relates generally to data processing systems, and more specifically, to data processing systems providing diagnostic information.

Related Art

Embedded systems such as microcontrollers and system on chip (SoC) devices may include a debug system. System developers typically rely on debug systems included in such embedded systems to facilitate access to information that may only be communicated internally between processors and peripherals and between peripherals. Debug systems which provide this type of access allow developers to diagnose problems or identify improvements more readily by providing diagnostic information outside of the embedded system. However, when debugging complex systems, large amounts of data may need to be captured and analyzed which can significantly exceed the bandwidth of the debug system. Therefore, there is a need for improved bandwidth utilization when transferring diagnostic information.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

The present disclosure describes herein, a debug system and method for real-time or near real-time debug. Bandwidth requirements generally associated with debug of an intelligent sensing systems can be improved by compressing and packing captured signals when forming diagnostic messages in accordance with an embodiment of the present disclosure.

Figure 1:
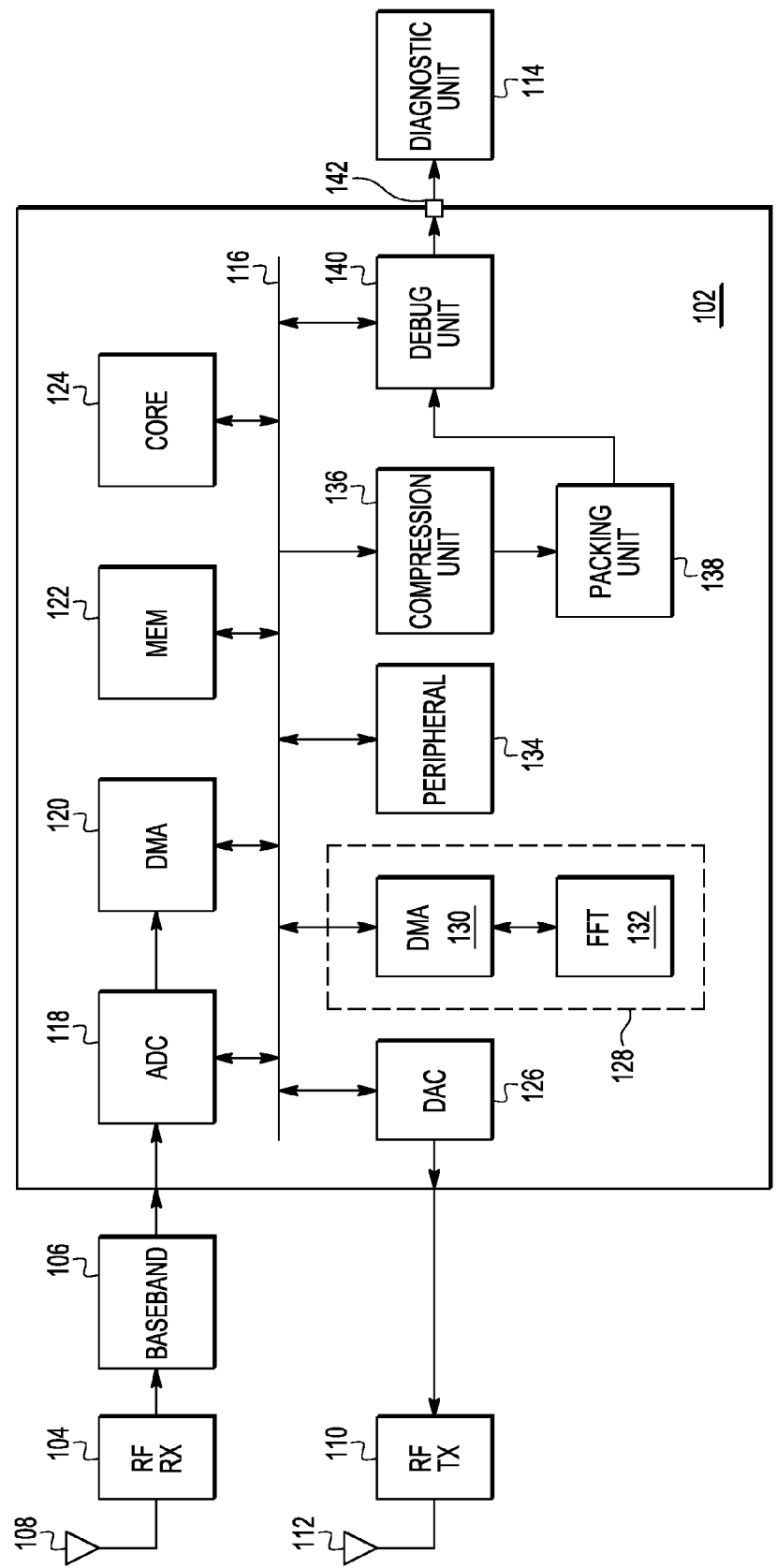
FIG. 1 is block diagram illustrating a data processing system according to an embodiment of the present disclosure.

FIG. 1 is a block diagram illustrating a data processing system according to an embodiment of the present disclosure. Data processing system 100 includes an embedded system 102, a radio frequency (RF) receiver unit (Rx) 104, a baseband unit 106, an RF transmitter unit (Tx), and a diagnostic unit 114. The Rx unit 104 is coupled to antenna 108 to receive RF signals. The Rx unit 104 is coupled to the baseband processing unit 106 wherein the received RF signals can be converted to baseband signals. In some embodiments, the received signal may be an analog signal modulated at about 77 gigahertz. Baseband processing unit 106 is coupled to an input of the embedded system 102 and can provide a continuous baseband signal based on a received continuous RF signal. In some embodiments, the Rx unit 104 and the baseband processing unit 106 may be combined in an integrated circuit. The Tx unit 110 is coupled to an output of embedded system 102 and to antenna 112 to transmit RF signals based on received signals from the embedded system 102. In some embodiments, the Rx unit 104, the baseband processing unit 106, the Tx unit 110, and the embedded system 102 may be combined in an integrated circuit.

The embedded system 102 may be any processing system such as a microcontroller, system on chip (SoC), and the like. Embedded system 102 includes a system bus 116, an analog to digital converter (ADC) unit 118, a first direct memory access (DMA) unit 120, a system memory 122, a processor core 124, a digital to analog converter (DAC) unit 126, a signal processing block 128, one or more peripherals 134, a compression unit 136, a packing unit 138, and a debug unit 140.

The ADC unit 118 is coupled to sample baseband signals output from the baseband unit 106. The ADC generates digitized signals in the time domain based on the sampled baseband signals. The ADC unit 118 is coupled to the system bus 116 for communication with the processor core 124 and coupled to the first DMA unit 120 for transferring digitized signals. The ADC unit 118 may receive a continuous baseband stream or a continuous baseband signal from the baseband unit 106. The ADC unit 118 may be a flash ADC, a successive-approximation ADC, a sigma-delta ADC, and the like, for example.

The DMA unit 120 is coupled to the ADC unit 118 and to the system bus 116 such that the digitized signals can be transferred from the ADC unit 118 to the system memory 122. The digitized signals may be stored in the system memory 122 temporarily or until needed or until used.

System memory 122 is coupled to system bus 116. System memory may be used to store digitized signals, compressed signals, as well as system data, programs, instructions, and the like. System memory 122 may have a portion of memory for storing data and a portion of memory for storing program instructions. System memory 122 may include any of SRAM memory, DRAM memory, non-volatile memory, register-file memory, and the like. System memory 122 may be organized in one or more arrays or blocks of memory.

Processor core 124 is coupled to the system bus 116 and communicates via the system bus 116 to peripherals 134, units 118, 120, 126, 128, 136, 140, and system memory 122. The processor core 124 can read and write program code and data, for example, from/to system memory 122. Processor core 124 can execute instructions stored in the system memory 122. In some embodiments, processor core 124 may include a plurality of processing cores such as application processors, digital signal processors (DSP), audio processors, and the like.

Digital to analog converter (DAC) 126 is coupled to the system bus 116. The DAC can receive digital information and convert the digital information into an analog signal. The analog signal output from the DAC 126 can be received by the RF transmitter (Tx) unit 110 and transmit a representative RF signal via antenna 112.

Signal processor 128 includes a second DMA unit 130 coupled between a fast Fourier transform (FFT) unit 132 and the system bus 116. DMA unit 130 can transfer digitized signals from the system memory 122 to the FFT unit 132. The FFT unit 132 can then transform the digitized signals to processed signals in the frequency domain. The DMA unit 130 can transfer frequency domain signal from the FFT unit 132 to the system memory 122.

One or more peripherals 134 may be included in embedded system 102. The one or more peripherals 134 may include any functional unit coupled to the system bus 116 such as a timer unit, a serial communication unit, a power management unit, and the like, for example.

Compression unit 136 is coupled to the system bus 116 and to a packing unit 138. Compression unit 136 can capture signals on the system bus 116 and compress the captured signals using any suitable compression technique such as a simple truncation of repeated data compression, a relative change compression, a Huffman encoding compression, and the like, for example. In this embodiment, the captured signals can include frequency domain signals being transferred from the signal processor 128 to the system memory 122. In some embodiments, the compression unit 136 can receive signals from a snoop unit coupled to the system bus 116.

Compressed signals from the compression unit 136 can be received by the packing unit 138. The packing unit 138 can efficiently pack or arrange the compressed signals into packed signals to be transferred to the debug unit 140.

Debug unit 140 is coupled to the system bus 116 and to the packing unit. The debug unit can receive compressed and packed signals from the packing unit 138. The debug unit 140 creates low-latency, near real-time diagnostic messages based on the received compressed and packed signals. The diagnostic messages are then transferred to the diagnostic unit 114 via a debug port 142. For example, four FFT results without compression and packing can typically require 256 bit of signal information to be transferred to the debug unit 140. Transferring the same four FFT results with compression and packing according to an embodiment of the present disclosure can require 60 bits of signal information to be transferred to the debug unit 140. Diagnostic messages from the debug unit 140 can be compliant with the Nexus IEEE-ISTO 5001 standard.

Diagnostic unit 114 is typically coupled to the debug unit 140 via the debug port 142. The diagnostic unit 114 can be a commercially available tool that is capable of receiving diagnostic messages based on an Aurora protocol.

Figure 2:
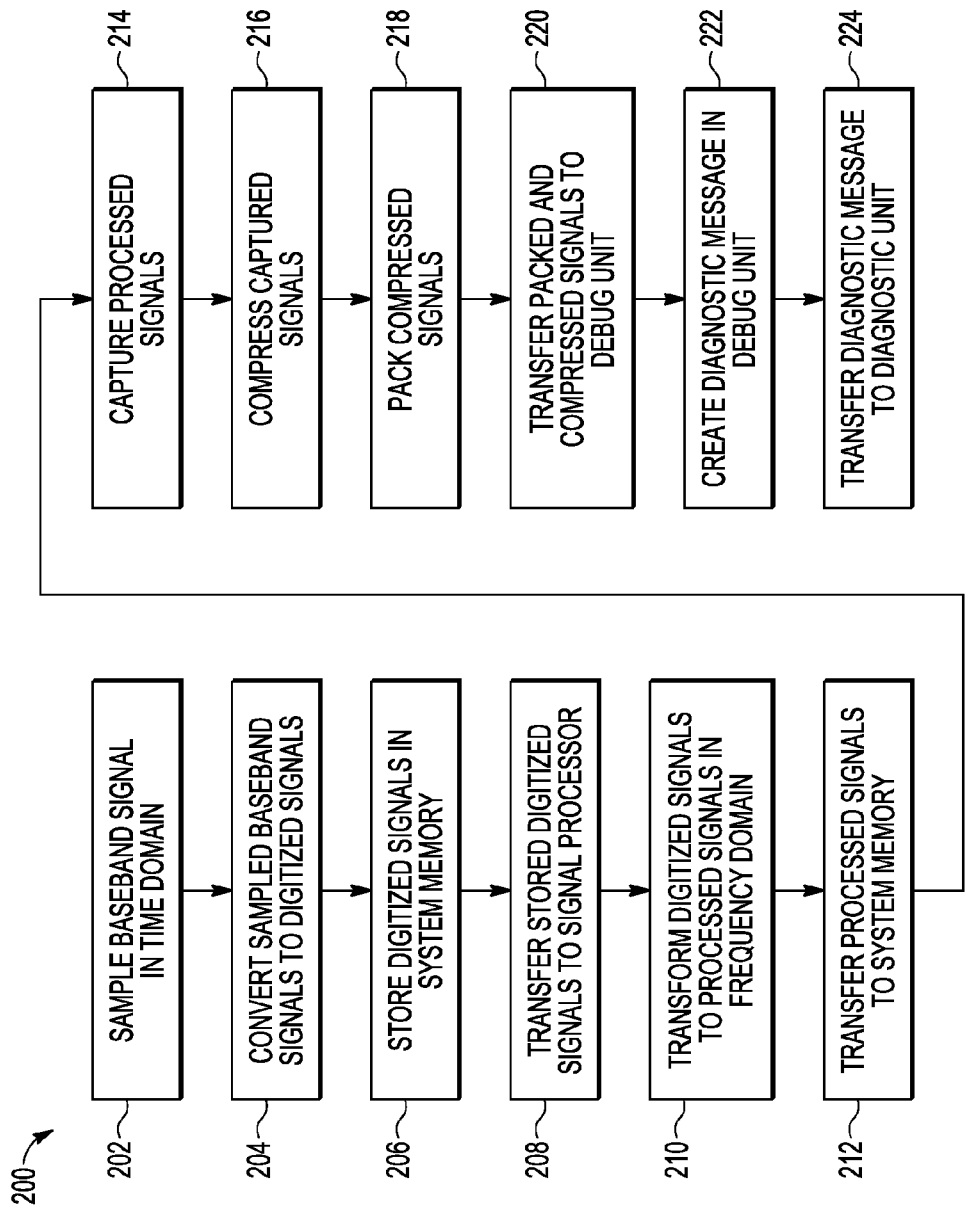
FIG. 2 is a flow diagram illustrating a method of transferring diagnostic data according to an embodiment of the present disclosure.

FIG. 2 is a flow diagram illustrating a method of transferring diagnostic data according to an embodiment of the present disclosure.

At step 202, a baseband signal is sampled in the time domain. The baseband signal can be derived from an RF signal. An ADC unit such as ADC 118, for example, may be coupled to receive baseband signals. The baseband signals may be sampled at the sampling rate of the ADC unit.

At step 204, sampled baseband signal are converted to digitized signals. The ADC unit generates a digitized signal in the time domain based on the sampled baseband signal. For each sampled time period, a sampled baseband signal value is converted to a corresponding digital value.

At step 206, digitized signals are stored in system memory 122. A first DMA unit 120 may be coupled to the ADC unit and to a system bus to transfer the digitized signals from the ADC unit to the system memory coupled to the system bus. The first DMA unit may be characterized as a sample DMA (SDMA). The system bus can be used for communication between functional units, processors, memory, peripherals and the like coupled to the system bus 116.

At step 208, stored digitized signals are transferred to a signal processor 128. The first DMA unit may be used to transfer digitized signals stored in the system memory to the signal processor coupled to the system bus. The signal processor may include a second DMA unit 130 coupled to the system bus and to a processing unit 132. The second DMA unit may be used to transfer digitized signals stored in the system memory to the processing unit via the system bus.

At step 210, digitized signals are transformed to processed signals in frequency domain. The processing unit may include a digital signal processor (DSP) or any functional unit capable of performing operations such as FFTs and the like. After receiving the digitized signals, the signal processor can convert the digitized signals with a fast Fourier transform process, for example, generating processed signals in the frequency domain.

At step 212, processed signals are transferred to system memory. The second DMA can transfer the processed signals to the system memory via the system bus. In some embodiments, the first DMA can transfer the processed signals to the system memory via the system bus when the processing unit is coupled to the system bus.

At step 214, processed signals are captured. When the processed signals are transferred to the system memory via the system bus, the processed signals can be captured by a compression unit 136. In some embodiments, snoop circuitry may be attached to the system bus to allow the processed signals to be captured. Each raw FFT result may include 64 bits of signal information.

At step 216, captured signals are compressed. After the processed signals are captured, the captured signals can be compressed by the compression unit. The compression unit may compress the captured signals using any suitable compression technique such as a simple truncation of repeated data compression, a relative change compression, a Huffman encoding compression, and the like. Each compressed result may include 15 bits of signal information.

At step 218, compressed signals are packed. After the compression unit compresses the captured signals, the compressed signal can be packed by a packing unit 138 coupled to the compression unit. The packing unit can efficiently pack or arrange the compressed signals forming packed signals to be transferred to a debug unit 140 coupled to the packing unit. Each packed result may include 30 bits of aligned signal information. Each 30 bits of aligned signal information may include two 15-bit compressed signal results.

At step 220, packed and compressed signals are transferred to debug unit. After the compressed signals are packed, the resulting packed signals may be transferred to the debug unit as 30-bit aligned signal information.

At step 222, diagnostic messages are created in debug unit. After receiving the messages from the packing unit, the debug unit can create low-latency, near real-time diagnostic messages based on the received compressed and packed signals. The debug unit may include a Nexus debug unit or the like. The diagnostic messages may be compliant with Nexus Aurora protocol, for example.

At step 224, diagnostic messages are transferred to a diagnostic unit 114. Diagnostic messages created in the debug unit can be transferred to a diagnostic unit via a diagnostic port. The diagnostic unit is typically located off-chip or separate from the system being debugged. The diagnostic unit may be electrically coupled to the diagnostic port. The diagnostic unit may be a Nexus trace tool or any commercially available or custom diagnostic unit which can receive and interpret the transferred diagnostic messages.

Figure 3:
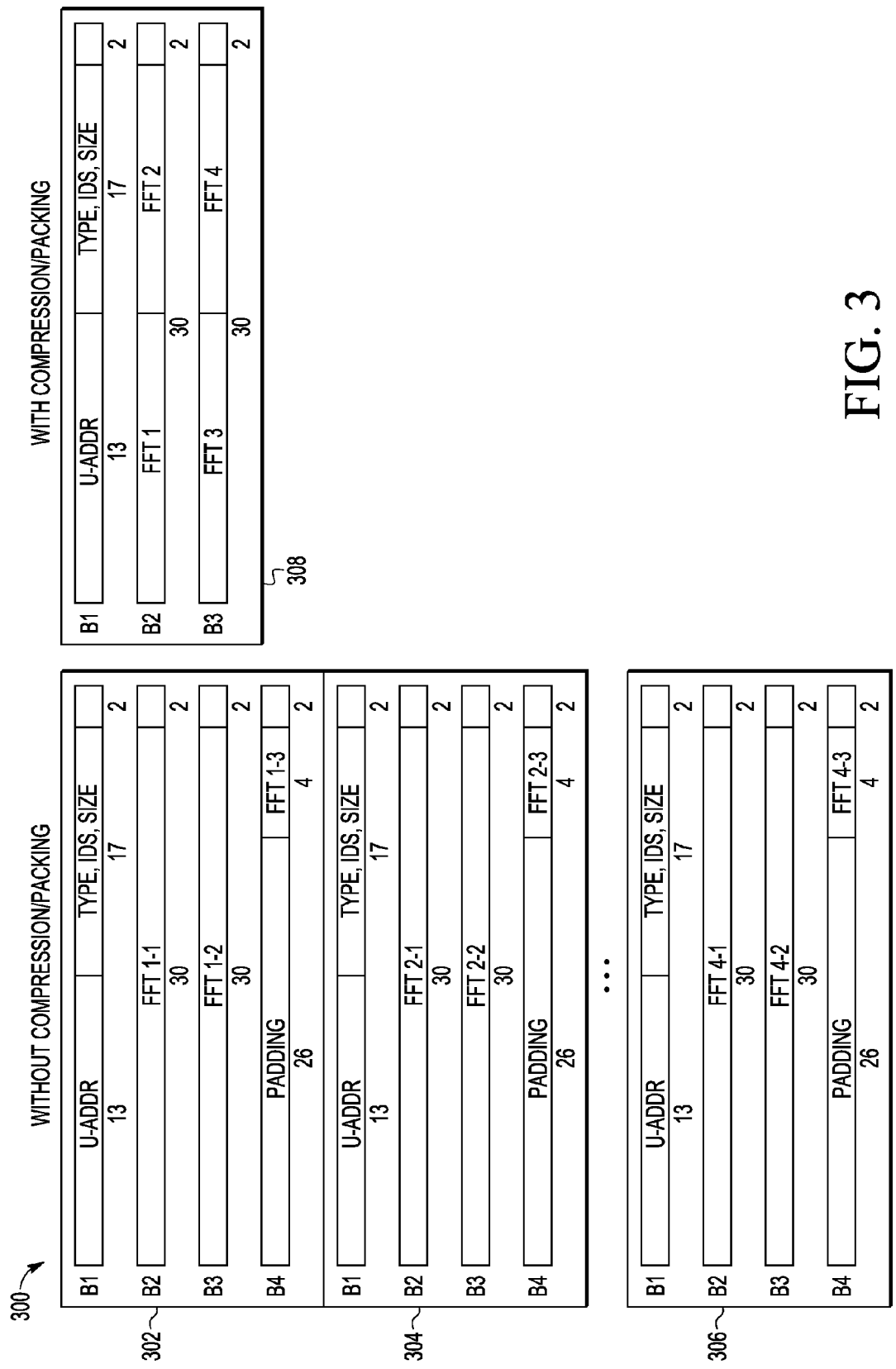
FIG. 3 is a diagram illustrating an exemplary message format of diagnostic data according to an embodiment of the present disclosure.

FIG. 3 is a diagram illustrating an exemplary messaging format of diagnostic messages 300 according to an embodiment of the present disclosure. Diagnostic messages 300 are divided into 32-bit portions, or beats, for illustrative purposes. The term beat as used herein, indicates a clock period by which a 32-bit portion of the diagnostic message can be transferred. These 32-bit portions are labeled b1 through b4 for four-beat diagnostic messages, where b1 indicates a first beat, for example.

Messages 302-306 can represent diagnostic data from four FFT results, without compression and without packing, formed into messages compatible with a Nexus trace unit (third message not shown). A first message 302 can include a header (b1) having a 13-bit address field, a 17-bit type, ID, size field, and a 2-bit control field. A data payload (b2-b4) for message 302 includes three 30-bit fields along with three 2-bit control fields as shown. Because each FFT result includes 64 bits of data, three beats (b2-b4) can be required to transfer the data portion of message 302. For instance, beat 2 (b2) includes 30 bits of the first FFT result (FFT 1-1), beat 3 (b3) includes 30 bits of the first FFT result (FFT 1-2), and beat 4 (b4) includes the remaining 4 bits of the first FFT result (FFT 1-3). Therefore, four beats can be required to transfer the header plus data payload for message 302 containing the first FFT result. The messages containing the remaining three FFT results can each require four beats, totaling 16 beats required to transfer four diagnostic messages, each containing an FFT result.

Message 308 represents diagnostic data from the four FFT results formed into a message compatible with the Nexus trace unit after using compression and packing according to an embodiment of the present disclosure. Message 308 includes a header (b1) having a 13-bit address field, a 17-bit type, ID, size field, and a 2-bit control field. The data payload (b2-b3) for message 308 includes two 30-bit fields along with two 2-bit control fields as shown. After compression, each FFT result is reduced from 64 bits to 15 bits. Packing allows two compressed FFT results to be included in one beat. Therefore, only one three-beat message is required to transfer the four FFT results according to an embodiment of the present disclosure. Reducing the bandwidth requirements from 16 beats to 3 beats to transfer four FFT results allows for significantly more diagnostic messaging bandwidth.

Generally, there is provided, a method for providing diagnostic information in a data processing system including: sampling baseband signals in time domain; converting the baseband signals to digitized signals; storing the digitized signals in a system memory; converting the digitized signals to processed signals in frequency domain; compressing the processed signals to generate compressed signals; packing the compressed signals to generate packed signals; and generating a diagnostic message from the packed signals. The method may further include providing the diagnostic message to a diagnostic tool, the diagnostic message having a packing structure with a data payload extended beyond a data payload defined by a diagnostic standard, the extended data payload being preceded by a single header. The diagnostic message may be compliant with the Nexus IEEE-ISTO 5001 standard. The method may further include storing the processed signals in a system memory. The method may further include compressing the processed signals using one or more of Huffman encoding, truncation of repeated data, and relative change compression. The method may further include converting the digitized signals to processed signals in frequency domain using a fast Fourier transform. The method may further include porting the diagnostic message to the diagnostic tool using an Aurora protocol. Sampling baseband signals in the time domain may further include receiving an analog signal modulated at about 77 gigahertz and producing the baseband signals from the analog signal. The analog signal may be characterized as being a low-latency near real-time diagnostic message.

In another embodiment, there is provided, a method for providing diagnostic information in a data processing system including: sampling baseband signals in time domain; converting the baseband signals to digitized signals; storing the digitized signals in a system memory; converting the digitized signals to processed signals in frequency domain using a fast Fourier transform; providing the processed signals to a system memory via a system bus; capturing the processed signals from the system bus; compressing the processed signals to generate compressed signals; packing the compressed signals to generate packed signals; and generating a diagnostic message from the packed signals. The method may further include providing the diagnostic message to a diagnostic tool in near real-time. The diagnostic message may be a low-latency near real-time diagnostic message compliant with the Nexus IEEE-ISTO 5001 standard. Capturing the processed signals from the system bus may further include non-intrusively capturing the processed signals. The method may further include compressing the processed signals using one or more of Huffman encoding, truncation of repeated data, and relative change compression. Sampling baseband signals in the time domain may further include receiving an analog signal modulated at about 77 gigahertz and produce the baseband signals from the analog signal.

In yet another embodiment, there is provided, a data processing system including: a system bus; an analog-to-digital converter having an input for sampling a baseband signal, and an output coupled to the system bus for providing a digitized signal representative of the baseband signal; a signal processing block, coupled to the system bus, for converting the digitized signal to a processed signal in the frequency domain; a first memory, coupled to the system bus, for storing the processed signal; a compression unit, coupled to the system bus, for capturing the processed signal and compressing the processed signal to produce a compressed signal; a packing unit, coupled to the compression unit, for packing the compressed signal to produce a packed signal; and a debug unit, coupled to the packing unit, for converting the packed signal to a diagnostic message. The compression unit may compress the processed signal to produce the compressed signal using one or more of Huffman encoding, truncation of repeated data, and relative change compression. The data processing system may further include a second memory, coupled to the system bus, for storing the digitized signal. The second memory may be characterized as being a predetermined address range of the first memory. The signal processing block may convert the digitized signal to a processed signal in the frequency domain using a fast Fourier transform.

By now it should be appreciated that there has been provided a debug system and method for real-time or near real-time debug. Bandwidth requirements generally associated with debug of an intelligent sensing systems can be improved by compressing and packing captured signals when forming diagnostic messages in accordance with an embodiment of the present disclosure.

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

Each signal described herein may be designed as positive or negative logic, where negative logic can be indicated by a bar over the signal name or an asterix (*) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Brackets are used herein to indicate the conductors of a bus or the bit locations of a value. For example, "bus 60 [7:0]" or "conductors [7:0] of bus 60" indicates the eight lower order conductors of bus 60, and "address bits [7:0]" or "ADDRESS [7:0]" indicates the eight lower order bits of an address value. The symbol "$" preceding a number indicates that the number is represented in its hexadecimal or base sixteen form. The symbol "%" preceding a number indicates that the number is represented in its binary or base two form.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention has been described with respect to specific conductivity types or polarity of potentials, skilled artisans appreciated that conductivity types and polarities of potentials may be reversed.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Some of the above embodiments, as applicable, may be implemented using a variety of different information processing systems. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for providing diagnostic information in a data processing system, the method comprising:
 sampling baseband signals in time domain;
 converting the baseband signals to digitized signals;
 storing the digitized signals in a system memory;
 converting the digitized signals to processed signals in frequency domain;

compressing the processed signals to generate compressed signals;

packing the compressed signals to generate packed signals; and generating a diagnostic message from the packed signals, the diagnostic message having a packing structure with a data payload extended beyond a data payload defined by a diagnostic standard, the extended data payload being preceded by a single header.

2. The method of claim 1, further comprising providing the diagnostic message to a diagnostic tool.

3. The method of claim 1, wherein the diagnostic message is compliant with the Nexus IEEE-ISTO 5001 standard.

4. The method of claim 1, further comprising storing the processed signals in a system memory.

5. The method of claim 1, further comprising compressing the processed signals using one or more of Huffman encoding, truncation of repeated data, and relative change compression.

6. The method of claim 1, further comprising converting the digitized signals to processed signals in frequency domain using a fast Fourier transform.

7. The method of claim 1, further comprising porting the diagnostic message to a diagnostic tool using an Aurora protocol.

8. The method of claim 1, wherein sampling baseband signals in the time domain further comprises receiving an analog signal modulated at 77 gigahertz and producing the baseband signals from the analog signal.

9. The method of claim 1, wherein the diagnostic message is characterized as being a low-latency near real-time diagnostic message.

10. A method for providing diagnostic information in a data processing system, the method comprising:

sampling baseband signals in time domain;

converting the baseband signals to digitized signals;

storing the digitized signals in a system memory;

converting the digitized signals to processed signals in frequency domain using a fast Fourier transform;

providing the processed signals to a system memory via a system bus;

capturing the processed signals from the system bus;

compressing the processed signals to generate compressed signals;

packing the compressed signals to generate packed signals; and generating a diagnostic message from the packed signals, the diagnostic message having a packing structure with a data payload extended beyond a data payload defined by a diagnostic standard, the extended data payload being preceded by a single header.

11. The method of claim 10, further comprising providing the diagnostic message to a diagnostic tool in near real-time.

12. The method of claim 10, wherein the diagnostic message is a low-latency near real-time diagnostic message compliant with the Nexus IEEE-ISTO 5001 standard.

13. The method of claim 10, wherein capturing the processed signals from the system bus further comprises non-intrusively capturing the processed signals.

14. The method of claim 10, further comprising compressing the processed signals using one or more of Huffman encoding, truncation of repeated data, and relative change compression.

15. The method of claim 10, wherein sampling baseband signals in the time domain further comprises receiving an analog signal modulated at 77 gigahertz and producing the baseband signals from the analog signal.

16. A data processing system comprising:

a system bus;

an analog-to-digital converter having an input for sampling a baseband signal, and an output coupled to the system bus for providing a digitized signal representative of the baseband signal;

a signal processing block coupled to the system bus for converting the digitized signal to a processed signal in the frequency domain;

a first memory, coupled to the system bus, for storing the processed signal;

a compression unit, coupled to the system bus, for capturing the processed signal and compressing the processed signal to produce a compressed signal;

a packing unit, coupled to the compression unit, for packing the compressed signal to produce a packed signal; and a debug unit, coupled to the packing unit, for converting the packed signal to a diagnostic message having a packing structure with a data payload extended beyond a data payload defined by a diagnostic standard, the extended data payload being preceded by a single header.

17. The data processing system of claim 16, wherein the compression unit compresses the processed signal to produce the compressed signal using one or more of Huffman encoding, truncation of repeated data, and relative change compression.

18. The data processing system of claim 16, further comprising a second memory, coupled to the system bus, for storing the digitized signal.

19. The data processing system of claim 18, wherein the second memory is characterized as being a predetermined address range of the first memory.

20. The data processing system of claim 16, wherein the signal processing block converts the digitized signal to a processed signal in the frequency domain using a fast Fourier transform.

* * * * *